United States Patent
Zambon et al.

(10) Patent No.: US 8,303,018 B2
(45) Date of Patent: Nov. 6, 2012

(54) DYNAMIC HOOK INSERT FOR A MOVABLE SEAT BACK

(75) Inventors: Tony A. Zambon, Canton, MI (US); James D. Biebel, Milford, MI (US)

(73) Assignee: Johnson Control Technology Company, Holland, MI (US)

( * ) Notice: Subject to any disclaimer, the term of this patent is extended or adjusted under 35 U.S.C. 154(b) by 87 days.

(21) Appl. No.: 11/968,275

(22) Filed: Jan. 2, 2008

(65) Prior Publication Data

US 2008/0164711 A1   Jul. 10, 2008

Related U.S. Application Data

(60) Provisional application No. 60/878,713, filed on Jan. 4, 2007.

(51) Int. Cl.
*B60N 2/02* (2006.01)
(52) U.S. Cl. .................. 296/65.02; 248/503.1
(58) Field of Classification Search .............. 296/65.02, 296/65.03, 65.09, 65.16; 248/503.1; 292/341.12, 292/DIG. 56
See application file for complete search history.

(56) References Cited

U.S. PATENT DOCUMENTS

| | | | |
|---|---|---|---|
| 4,358,141 A | 11/1982 | Hamada | |
| 4,679,836 A | 7/1987 | Pupillo et al. | |
| 4,756,564 A | 7/1988 | Ikeda | |
| 4,759,580 A | 7/1988 | Berklich, Jr. et al. | |
| 4,783,103 A | 11/1988 | Schlegel | |
| 4,896,908 A | 1/1990 | Kleefeldt | |
| 5,498,052 A | 3/1996 | Severini et al. | |
| 5,606,771 A | 3/1997 | Young | |
| 5,632,517 A | 5/1997 | Paulik et al. | |
| 5,727,825 A | 3/1998 | Spurr | |
| 5,918,918 A | 7/1999 | Mosley | |
| 6,050,117 A | 4/2000 | Weyerstall | |
| 6,182,527 B1 | 2/2001 | Sander | |
| 6,283,550 B1 | 9/2001 | Vialatte et al. | |
| 6,749,234 B2 * | 6/2004 | Bruce | 292/216 |
| 6,820,912 B1 | 11/2004 | Lavoie | |
| 6,908,137 B2 | 6/2005 | Doxey et al. | |
| 7,121,609 B2 | 10/2006 | Tame | |
| 7,195,292 B2 | 3/2007 | Ketelsen et al. | |
| 7,229,118 B2 | 6/2007 | Saberan | |
| 7,270,371 B2 | 9/2007 | Adragna et al. | |
| 7,296,840 B2 * | 11/2007 | Martone et al. | 296/65.03 |
| 7,306,269 B2 * | 12/2007 | Cetnar et al. | 292/341.12 |
| 7,475,923 B2 * | 1/2009 | Ottino et al. | 292/216 |
| 2007/0273171 A1 * | 11/2007 | Ito et al. | 296/65.16 |
| 2009/0026790 A1 * | 1/2009 | O'Connor et al. | 296/65.03 |

* cited by examiner

*Primary Examiner* — Jason S Morrow
(74) *Attorney, Agent, or Firm* — Dickinson Wright PLLC

(57) ABSTRACT

A device and method for reducing noises created by a movable seat back that is tethered to a cabin wall. The seat back has a latch bracket that hooks over a rigid striker pin extending from the cabin wall. A dynamic hook insert, manufactured from a polymeric material, lines the latch bracket and makes direct contact with the striker pin. The insert is provided with a resiliently bendable section spaced from direct contact with the latch bracket. The resiliently bendable section is dynamically movable for absorbing vibrations transferred to and from the striker pin and for automatically accommodating dimensional variances in the striker pin.

17 Claims, 7 Drawing Sheets

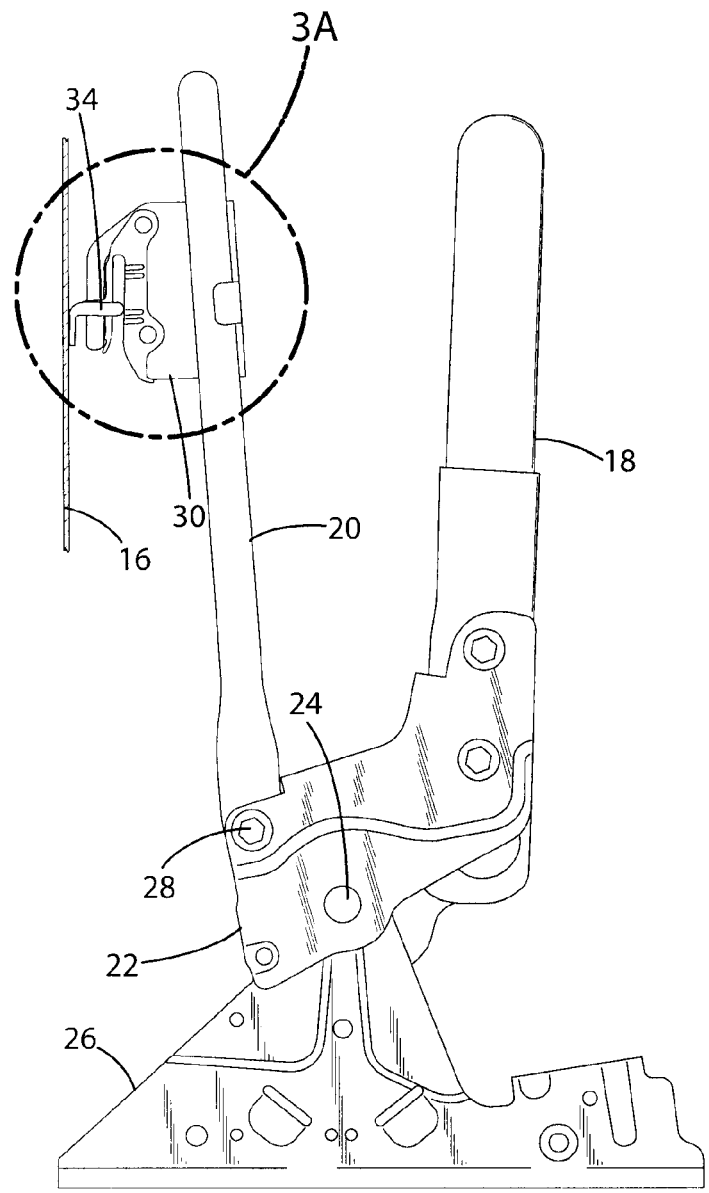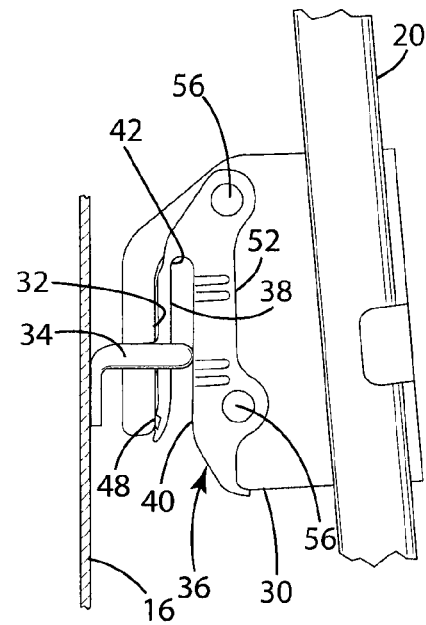
Fig. 5A
Fig. 5

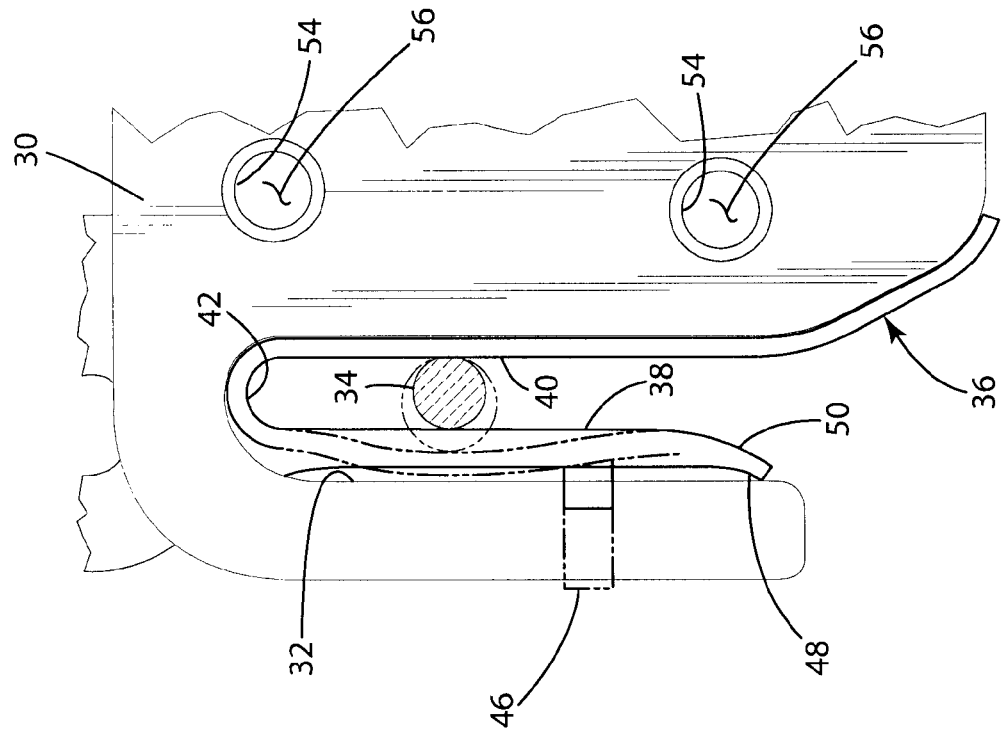
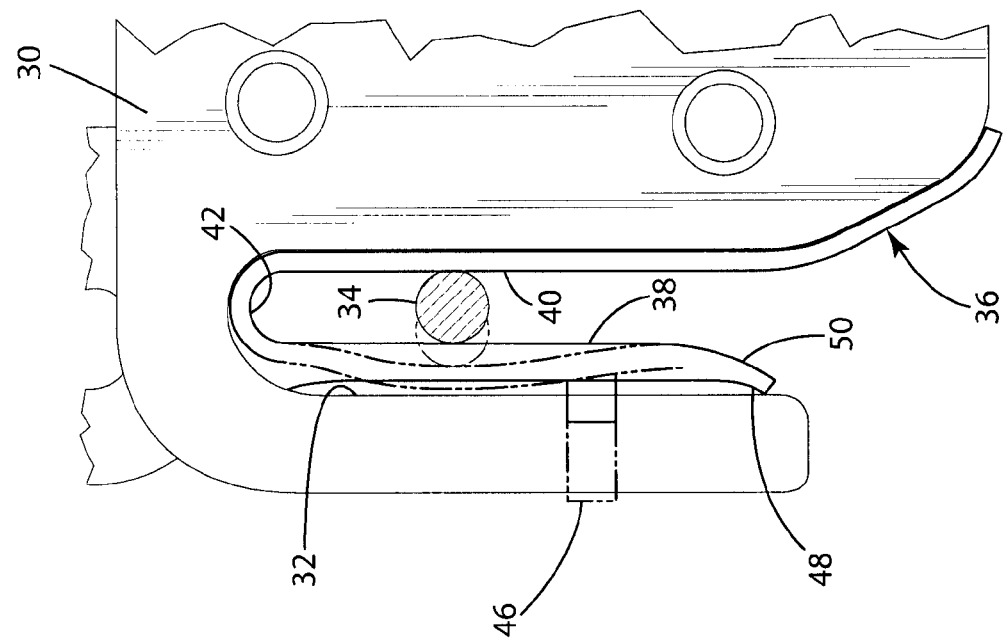

DYNAMIC HOOK INSERT FOR A MOVABLE SEAT BACK

CROSS REFERENCE TO RELATED APPLICATIONS

The present application claims priority to U.S. provisional application entitled Cab Hook Isolator having Ser. No. 60/878,713 and filed on Jan. 4, 2007.

BACKGROUND OF THE INVENTION

1. Field of the Invention

The present invention relates generally to the field of vehicular seating, and more particularly to an improved device to minimize seat vibration for movable seat backs of the type tethered to a cabin wall.

2. Related Art

Strategies for efficiently seating passengers in a cabin space are desirable in many fields including automobiles, trucks, buses, trains, nautical vehicles and the like. In many instances, a seat will be located with its backrest directly adjacent a wall of the cabin (or a wall in the cabin) and configured as either a "stadium" type seat where the seat cushion and backrest can be folded to an upright, stowed condition, or the seat and back assembly can be shifted forward in a "slouch" configuration. The second row of a pickup truck is a common application for both slouch and stadium seat configurations which are considered attractive to purchasers.

Although prior art movable seat back designs work reasonably well, they tend to be the source of much buzzing, squeaking and rattling (BSR) noises. In both stadium and slouch-seating arrangements, a rigid, metallic striker wire or pin extends from the cabin wall. A rigid metallic latch bracket on the movable seat back, having an elongated, generally U-shaped slot formed therein, hooks over the striker pin to tether the seat back to the cabin wall. The elongated U-shaped slot allows the seat back to move between its various positions while remaining tethered to the cabin wall. However, this point of connection between the seat back and the cabin wall generates the vibrations that result in objectionable BSR noise.

Various proposals have been advanced to address the BSR concern arising from vibrations between the striker pin and the latch bracket. One example is illustrated in U.S. Pat. No. 7,270,371 granted Sep. 18, 2007. In this reference, it is suggested to line the U-shaped slot in the latch bracket with a plastic insert to dampen noises. This technique, in fact, is fairly well known in the seating environment, as depicted in non-stadium and non-slouch seating configurations such as U.S. Pat. No. 6,283,550 granted Sep. 4, 2001, and U.S. Pat. No. 4,759,580 granted Jul. 26, 1988. In these examples, a static, anti-noise or vibration dampening part is associated with a hook slot of the seat frame to prevent metal-to-metal contact with an anchoring pin.

Prior art attempts to eliminate or minimize BSR in a vehicle seat are only partially effective. Because the vibration dampening inserts are static, i.e., they are rigidly and immobly fixed relative to the latch bracket, vibrations albeit dampened are still transmitted directly into the seat frame and/or other surrounding rigid structures and resonate with BSR symptoms.

Another issue with stadium and slouch seat configurations is the inevitable dimensional variances between the diameter of the striker pin and the width of the slot in the latch bracket. In one extreme, excess play in this sliding connection will intensify BSR and premature wear. In the other extreme, a tight fit may result in stiff operation and premature wear. Accordingly, there is a need to further eliminate or further minimize seat vibrations when a movable seat back is tethered to a cabin wall, and to better accommodate dimensional variances between the manufactured components of the sliding latch bracket connection.

SUMMARY OF THE INVENTION

According to this invention, a dynamic hook insert is provided for a movable seat back of the type tethered to a cabin wall. The insert comprises a body configured for attachment to a latch bracket on a seat back. An elongated, generally U-shaped channel is formed in the body. The channel is configured to slidably receive a striker pin extending from a cabin wall. A stand-off extends from the body generally transversely away from the U-shaped channel for creating a bendable section in the body to dynamically absorb vibrations transferred to and from the striker pin and for automatically accommodating dimensional variance in the striker pin.

According to another aspect of this invention, a movable seat back assembly is provided of the type normally tethered to a cabin wall. The assembly comprises a seat back having a rearward surface presenting toward a cabin wall. A rigid latch bracket extends from the rearward surface of the seat back. The latch bracket includes an elongated, generally U-shaped slot for receiving a striker pin anchored to the cabin wall. A dynamic hook insert is directly connected to the latch bracket. The insert includes a pair of generally parallel legs spaced apart from one another and joined together at their respective upper ends. A separation between the legs forms an elongated, generally U-shaped channel lining the U-shaped slot of the latch bracket. At least one of the legs of the insert is generally transversely spaced from the slot of the latch bracket and comprises a resiliently bendable section that is dynamically movable relative to the latch bracket for absorbing vibrations transferred to and from the striker pin and for automatically accommodating dimensional variances in the striker pin.

According to yet another aspect of this invention, a method is provided for reducing vibration-induced noise in the connection between a movable seat back and a cabin wall. The method comprises the steps of: providing a latch bracket on a seat back having a U-shaped slot; lining the slot with a polymeric insert having a complimentary U-shaped channel; providing a striker pin on the cabin wall; tethering the seat back to the cabin wall by slidably engaging the striker pin inside the channel; and creating a resiliently bendable section in the insert for dynamically deflecting in the region of abutting contact with the striker pin.

As expressed in these various aspects of the invention, the subject hook insert is distinguished from the static, prior art designs feature in that a resiliently bendable section is formed so as to dynamically absorb vibrations transferred to and from the striker pin. This same resiliently bendable section is also advantageous for automatically accommodating dimensional variance in the diameter of the striker pin and/or width of the slot.

BRIEF DESCRIPTION OF THE DRAWINGS

These and other features and advantages of the present invention will become more readily appreciated when considered in connection with the following detailed description and appended drawings, wherein:

FIG. 5 is a view as in FIG. 3 but depicting the seat frame portion in a stowed, non-use condition;

FIG. 5A is an enlarged view of the area circumscribed at 5A in FIG. 5;

FIG. 8 is an enlarged side view of the subject hook insert disposed in a latch bracket and with a striker pin shown in phantom and solid conditions to illustrate the resiliently bendable section in the insert body; and FIG. 9 is a view as in FIG. 8, but depicting a striker pin having a small dimensional composition in solid and an enlarged dimensional composition in phantom lines, with the resiliently bendable section automatically accommodating for the dimensional variance.

DETAILED DESCRIPTION OF THE PREFERRED EMBODIMENT

Figure 1:
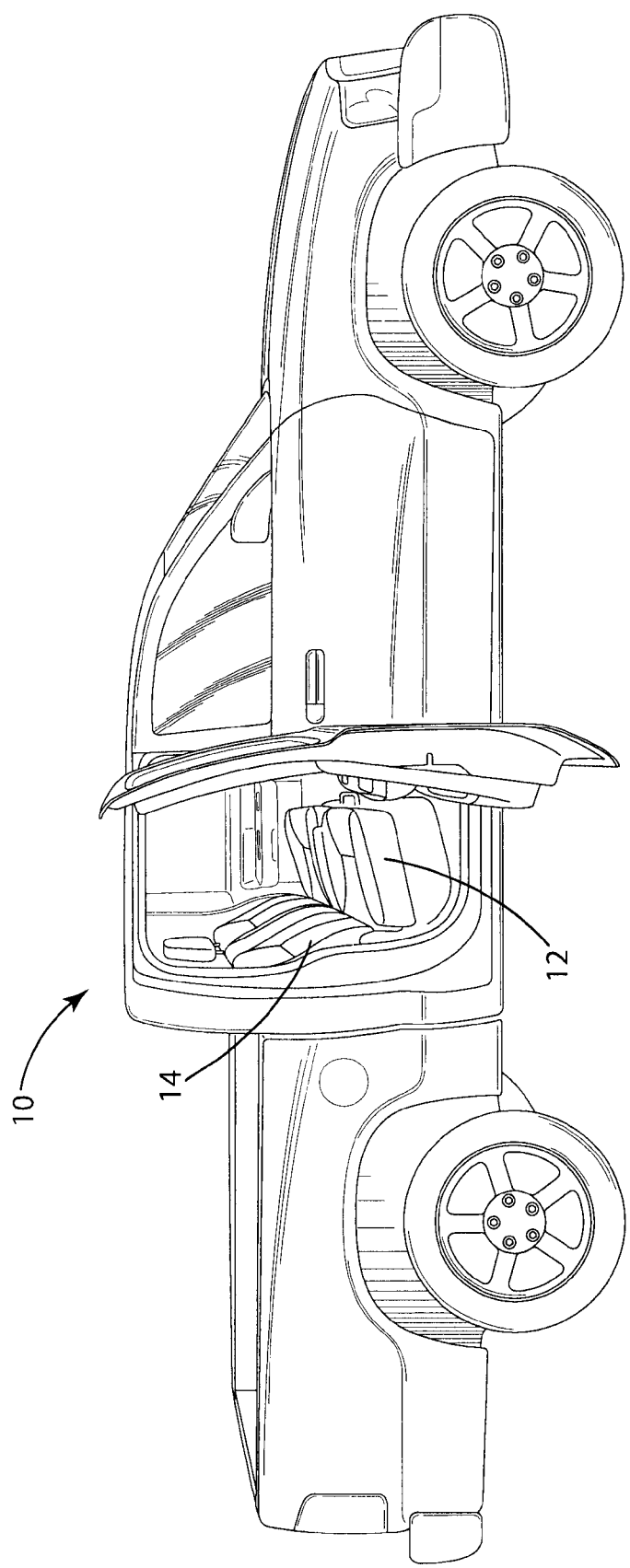
FIG. 1 is a simplified perspective view of an extended cab pickup truck which forms one exemplary application for the subject invention.

Referring to the Figures, wherein like numerals indicate like or corresponding parts throughout the several views, an extended cab pickup truck is generally shown at 10 in FIG. 1. While one particularly advantageous application of this invention is second row seating in pickup truck type vehicles, it is to be understood that the subject invention can be used in a variety of fields and applications including automobiles, SUVs, vans, trucks, buses and the like, as well as aircraft, railroad vehicle, nautical vehicle, and other seating environments. Notwithstanding, the following description will be, for convenience, related specifically to rear seating applications in a pickup truck 10. Here, the rear seats are shown including a bottom or seat cushion 12 and a seat back 14.

Figure 2:
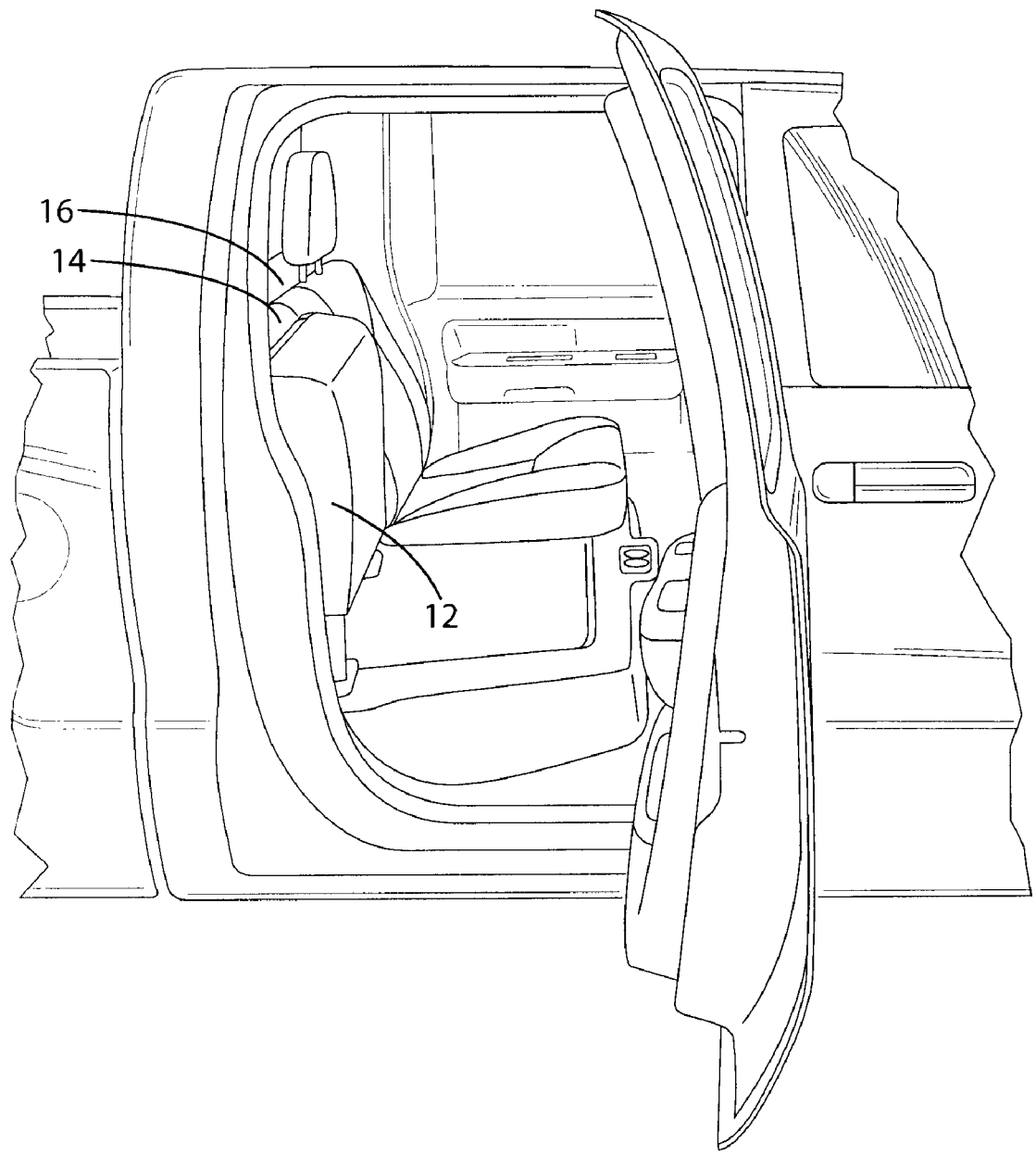
FIG. 2 is an interior view of the rear seat region in an extended cab pickup truck, depicting a stadium seat type assembly having one section deployed in the sitting condition and another section retracted to a stowed condition.
Figures 3, 3A:
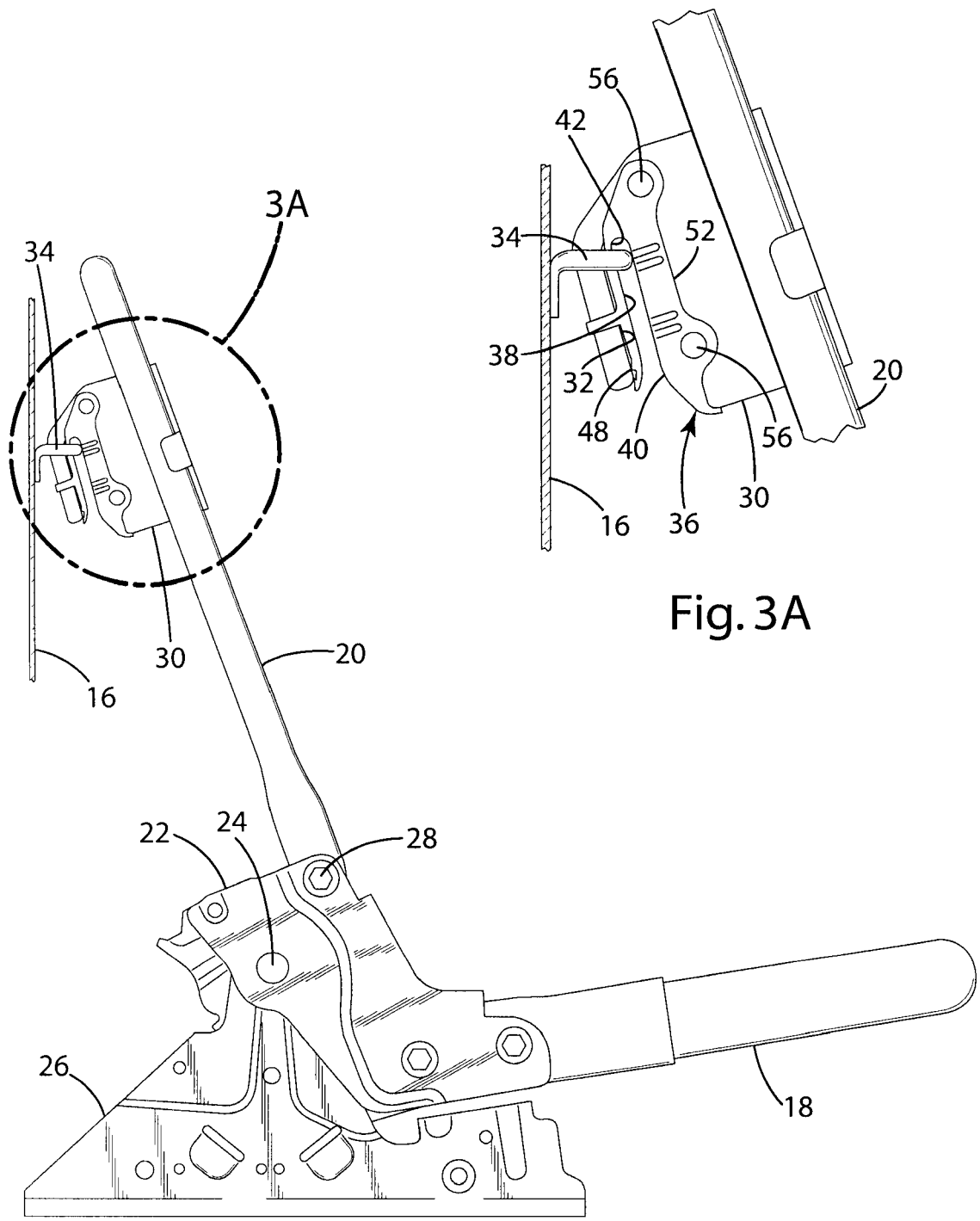
FIG. 3 is a simplified side view of a stadium seat type assembly according to one embodiment of this invention fully deployed in the sitting or use condition.
FIG. 3A is an enlarged view of the area circumscribed at 3A in FIG. 3.
Figures 4, 4A:
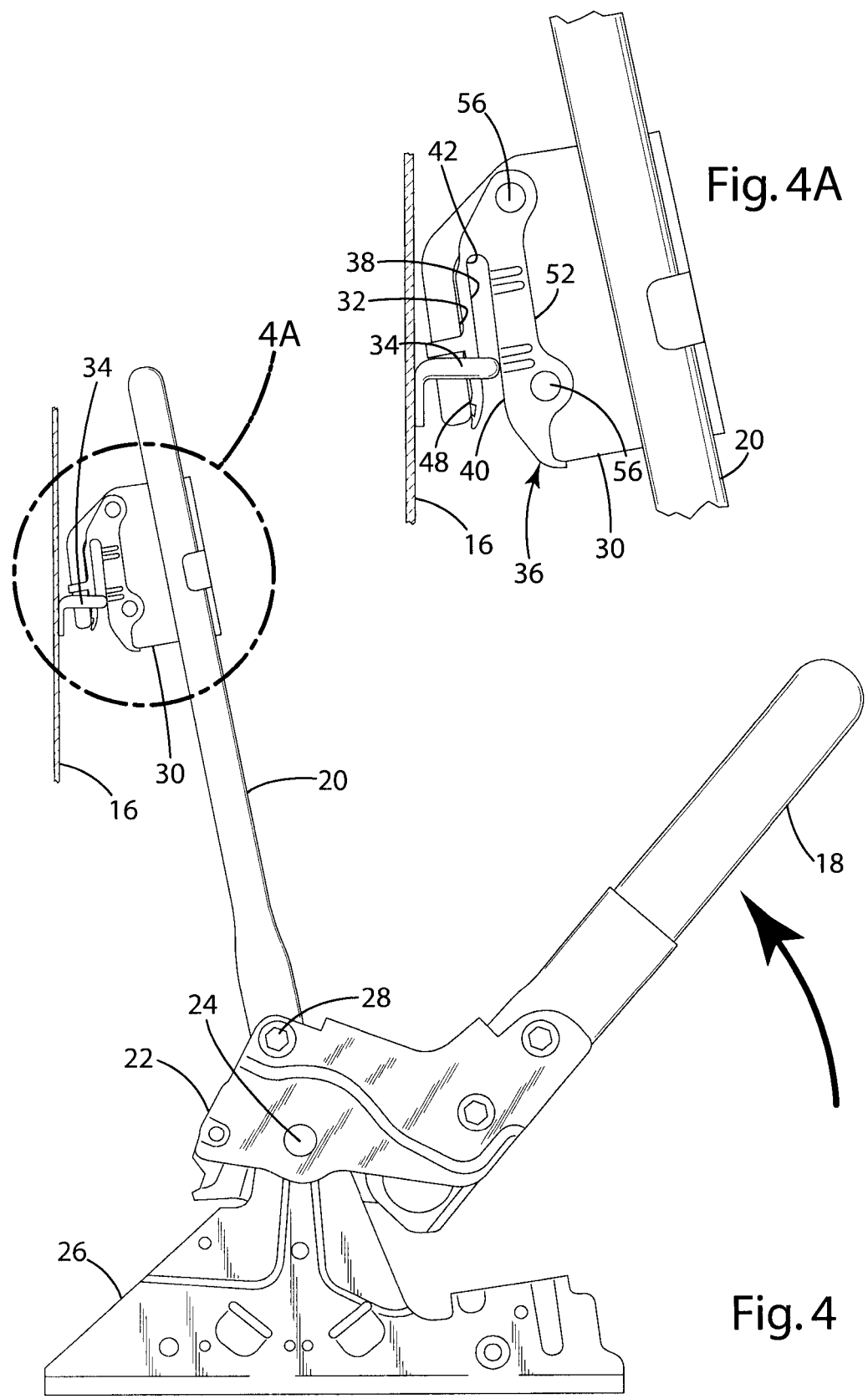
FIG. 4 is a view as in FIG. 3 but depicting the seat frame portion in an intermediate condition between stowed and use positions.
FIG. 4A is an enlarged view of the area circumscribed at 4A in FIG. 4.

As shown in FIG. 2, the seats may be of the 60/40 split type, wherein approximately 40% of the seat length is independently articulable relative to the remaining 60%. One of the seat sections is shown in a stowed or folded or non-use condition, whereas the other section is shown in a deployed, sitting or use position. Other seat arrangements can include a full length bench seat, individual seats, and other arrangements. Also, the invention is here shown in the stadium seating format, wherein the seat cushion 12 can be rotated to a generally vertical, non-use position with a connecting linkage simultaneously moving the seat back 14 to a more fully upright, vertical orientation for maximum space saving. This stadium seat configuration can be used in conjunction with, or substituted entirely for, a slouch-seating configuration such as that depicted in U.S. Pat. No. 7,270,371, the entire disclosure of which is hereby incorporated by reference. In both applications, i.e. both stadium seating, slouch-seating, and combined stadium and slouch-seating configurations, the seat back 14 is tethered to the rear cabin wall 16 which in this case comprises the back wall of the passenger compartment area. In other seating configurations, such as buses and trains, the cabin wall may be merely a partition or other fixture within the passenger area.

Turning now to FIGS. 3-5A, an exemplary frame construction for a seat assembly incorporating the subject invention is shown in side elevation. Commonly, seats are padded with foam or other cushioning material and covered with fabric, vinyl, leather or other materials known and used in the seating art. Such padding, covering and trim is not illustrated in these figures to facilitate a better understanding of this invention. Furthermore, the seats as hereinafter described do not include power adjust mechanisms, lumbar supports, or other variations which may be suitable for use together with the invention. Those with skill in the art must appreciate that this invention is not limited to the specific structural components of the illustrated seat assembly and that the novel aspects are readily adaptable to other seat types.

Thus, in FIGS. 3-5A, the seat cushion is represented by the skeletal seat frame 18 and the seat back is represented by its skeletal back frame 20. These are illustrated as tubular members, but may be otherwise designed. The seat frame 18 is joined to a pivot bracket 22 which is hingedly joined about pivot pin 24 to a floor bracket 26. Thus, in moving between the use and stored conditions, the seat frame 18 is manually rotated about pivot pin 24. This can be seen by reference, in sequence, to FIGS. 3 then 4 then 5. The back frame 20 is pivotally connected to the pivot bracket 22 about back pivot 28. Thus, as the seat frame 18 is manipulated between the stowed and use positions, the back pivot 28 sweeps an arc centered about the pivot pin 24.

The back frame 20 includes a rearward surface presenting toward the cabin wall 16. A rigid latch bracket 30 extends from the rearward surface of the back frame 20. The latch bracket 30 has an elongated, generally U-shaped slot 32 as perhaps best shown in FIGS. 8 and 9. The slot 32 is configured to receive a striker pin 34 which extends from the cabin wall 16. Usually, although not necessarily, the striker pin 34 is a metal body with a generally circular cross-section. As here depicted, the striker pin 34 is generally U-shaped and extends outward from the cabin wall 16 in a generally horizontal orientation. The back frame 20 is, in effect, tethered to the cabin wall 16 via the striker pin 34 captured inside the slot 32 of the latch bracket 30. Thus, as seen in FIGS. 3-5*a*, the latch bracket 30 rides up and down along the striker pin 34 as the seat frame 18 is manipulated between use and stowed conditions. The entire structure is thus constrained to movement as a four-bar linkage mechanism.

Figure 6:
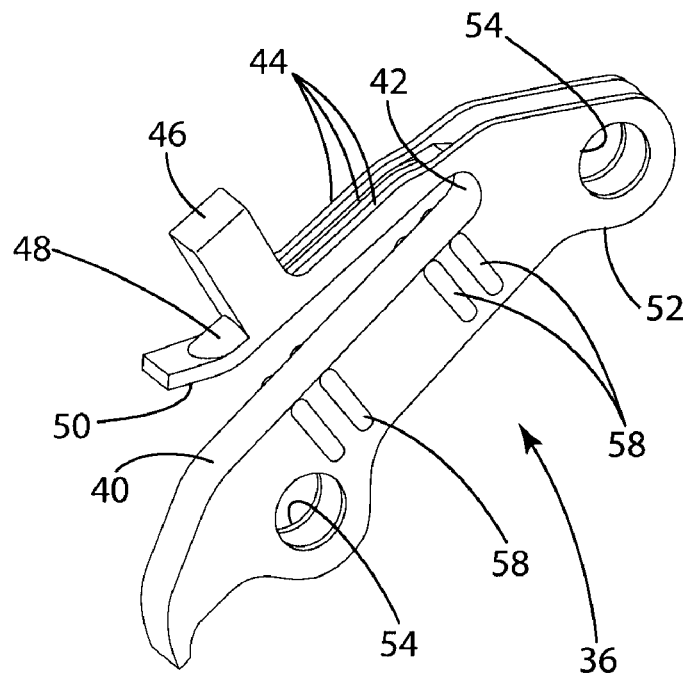
FIG. 6 is a perspective view of a dynamic hook insert according to one embodiment of the subject invention.

Objectionable buzz, squeak and rattle (BSR) noises which might otherwise be generated between the striker pin 34 in slot 32 are eliminated, or else substantially reduced, by the use of a dynamic hook insert, generally indicated at 36, which is directly connected to the latch bracket 30. The insert 36 is perhaps best shown in FIGS. 6 and 7 having a body which, in one embodiment, is formed of a polymeric material in an injection molding process. The insert body is configured for attachment directly to the latch bracket 30. The insert 36 includes a pair of generally parallel legs 38, 40 spaced apart from one another and converging at the respective upper ends 42. A separation between the legs 38, 40 forms an elongated, generally U-shaped channel lining the U-shaped slot 32 of the latch bracket 30. The one leg 38 is generally transversely spaced from the slot 32 as shown in FIGS. 8 and 9. This leg 38 comprises a resiliently bendable section which is dynamically movable within the space between the latch bracket 30 as shown in FIGS. 8 and 9, for absorbing vibrations transferred to and from the striker pin 34 and for automatically accommodating dimensional variances in the striker pin 34. The resiliently bendable leg 38 may be backed with one or more ribs 44 sized and shaped to create a specified modulus of elasticity. This bendable leg 38 may further include a retaining strap 46 that extends generally transversely away from the U-shaped channel for operative interaction with the latch bracket 30. The retaining strap 46 may be either a pair of flanges which straddle opposite sides of the latch bracket 30, or as depicted in FIG. 6 a full encircling collar to securely retain the bendable leg 38 in the proper position, or some other mechanically equivalent structure.

In the preferred embodiment, the separation between the bendable leg 38 and the latch bracket 30 is accomplished by a stand-off 48 which forms a fulcrum-like point of contact between the distal end of the leg 38 and the latch bracket 30. In essence, the stand-off 48 transforms the entire leg 38 into a flexible beam. In an alternate version of this invention not illustrated, the stand-off may be formed as a nub integral with the latch bracket 30, or in yet another example as an independent component inserted between the latch bracket 30 and the insert 36. In a still further example, the resiliently bendable section may be formed entirely integral within the insert body itself, and not as a result of any particular interaction with the latch bracket 30. In other words, the bendable section could be created by a fully included slot in the insert body that runs parallel to the channel. The bendable leg 38 also includes a chamfer 50 adjacent the mouth-like opening to the channel for facilitating ingress of the striker pin 34. Thus, the stand-off 48 and chamfer 50 are both located at the distal end of the leg 38, adjacent the mouth of the channel which receives the striker pin 34.

Figure 7:
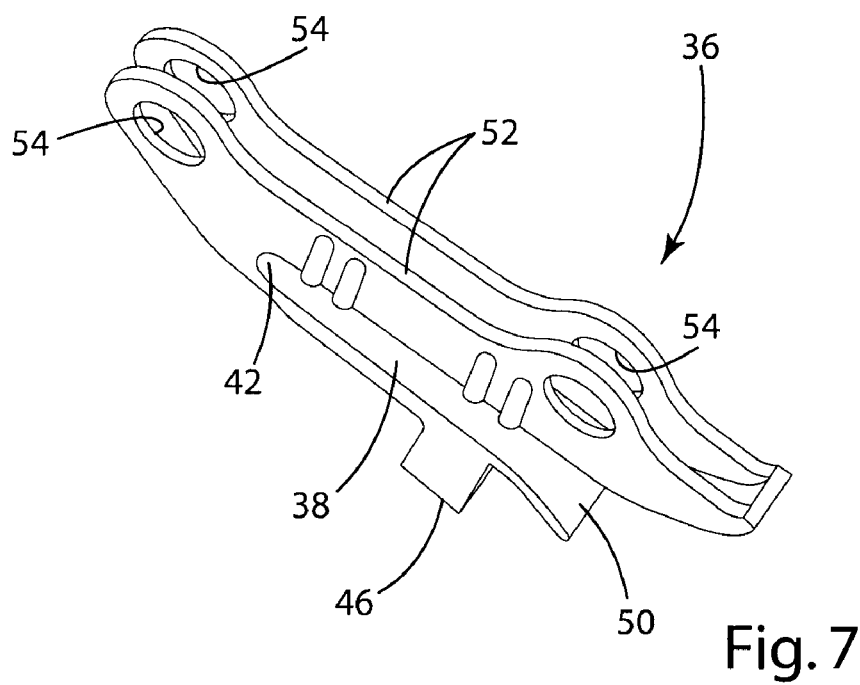
FIG. 7 is a perspective view of the dynamic hook insert from a different angle.

The other leg 40 of the insert 36 includes at least one, but preferably two mounting flanges 52 as best shown in FIG. 7. The mounting flanges 52 are spaced apart from one another the width of the latch bracket 30, and thereby straddle opposite faces of the latch bracket 30 to provide a snug fit. The mounting flange 52 includes holes 54 which are aligned with corresponding holes in the latch bracket 30 to receive mechanical fasteners 56. The fasteners 56 may take the form of rivets, bolts or other appropriate devices. Alternatively, the insert 36 may be retained in position on the latch bracket 30 by other methods or devices including self-locking features, overmolding, adhesives and the like. The mounting flanges 52 can be provided with strengthening features 58 as needed.

This invention also contemplates a method for reducing vibration-induced noise in the connection between a movable seat back 14 and a cabin wall 16. The method steps include providing a latch bracket 30 on the seat back 14, which latch bracket 30 has a U-shaped slot 32. The method further includes lining the slot 32 with a polymeric insert 36 having a complimentary U-shaped channel. A striker pin 34 is provided on the cabin wall, and serves to tether the seat back 14 to the cabin wall 16 by slidably engaging the striker pin 34 inside the channel. Vibration reduction is accomplished by creating a resiliently bendable section in the insert 38 for dynamically deflecting in the region of the striker pin 34 in response to mechanical vibrations. The step of creating a resiliently bendable section may include interposing a stand-off between the insert 36 and the slot 32 of the latch bracket 30 to establish an air space between at least a portion of the insert 36 and the slot 32. The step of lining the slot 32 may include locating the bendable section 38 relative to the latch bracket 30 with a retaining strap 46.

As shown in FIG. 9, the insert 36 is also particularly advantageous in automatically accommodating for dimensional variances in the diameter of the striker pin 34 and/or the width of the slot 32. A striker pin 34 having an enlarged diameter is depicted in broken lines in FIG. 9. In relative terms, however, this may also be considered equivalent to a reduction in the width of the slot 32 via manufacturing variability. It will be evident that the resiliently bendable leg 38 automatically deflects under the influence of this enlarged diameter striker pin 34, without creating undue stress or adversely affecting the interaction of the latch bracket 30 when the seat is moved between its use and stowed positions. Thus, the insert 36 can be seen as a generally resilient body that is capable of deforming so as to absorb at least some of the motion of the striker pin 34 relative to the latch bracket 30. Such configuration allows for manufacturing tolerances of both the slot 32 and the striker pin 34 while maintaining a snug, functional fit. Furthermore, the insert 36 can be easily serviced. Mounting flanges 52 stabilize the insert 36 in position on the latch bracket 30, while the retaining strap 46 and ribs 44 add further functionality.

The construction and arrangement of the insert 36 as shown in the various exemplary embodiments is illustrative only. Although only a few embodiments of the present invention have been described in detail, those with skill in the art will readily appreciate that many modifications are possible. The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A dynamic hook insert for a movable seat back tethered to a cabin wall, said insert comprising:
   a body configured for attachment to a latch bracket on a seat back;
   an elongated, generally U-shaped channel formed in said body, said channel configured to slidably receive a striker pin extending from a cabin wall; and
   a stand-off extending from said body generally transversely away from said U-shaped channel for creating a bendable section in said body to dynamically absorb vibrations transferred to and from the striker pin and for automatically accommodating relative dimensional variance in the striker pin.

2. The insert of claim 1 wherein said body includes at least one mounting flange.

3. The insert of claim 2 wherein said channel includes a mouth, said bendable section including a chamfer adjacent said mouth for facilitating ingress of the striker pin.

4. The insert of claim 3 wherein said stand-off is disposed adjacent said mouth.

5. The insert of claim 3 wherein said bendable section includes a retraining strap extending generally transversely away from said U-shaped channel for operative interaction with the latch bracket.

6. The insert of claim 1 wherein said body includes a pair of spaced apart mounting flanges on one side of said channel.

7. A movable seat back assembly of the type normally tethered to a cabin wall, said assembly comprising:
   a seat back having a rearward surface presenting toward a cabin wall;

a rigid latch bracket extending from said rearward surface, said latch bracket including an elongated generally U-shaped slot for receiving a striker pin anchored to the cabin wall;

a dynamic hook insert directly connected to said latch bracket, said insert including a pair of generally parallel legs spaced apart from one another and joined together at their respective upper ends, a separation between said legs forming an elongated, generally U-shaped channel lining said U-shaped slot of said latch bracket; and at least one of said legs of said insert being generally transversely spaced from said slot of said latch bracket and comprising a resiliently bendable section dynamically movable relative to said latch bracket for absorbing vibrations transferred to and from the striker pin and for automatically accommodating relative dimensional variances in the striker pin.

8. The assembly of claim 7 further including a stand-off disposed between said bendable section and said latch bracket for maintaining said space there between.

9. The assembly of claim 8 wherein said stand-off is integrally formed on said bendable section of said insert.

10. The assembly of claim 9 wherein said insert includes at least one mounting flange on said leg opposite said resiliently bendable section.

11. The assembly of claim 10 wherein said channel includes a mouth, said bendable section including a chamfer adjacent said mouth for facilitating ingress of a striker pin.

12. The assembly of claim 11 wherein said stand-off is disposed adjacent said mouth.

13. The assembly of claim 11 wherein said bendable section includes a retaining strap extending generally transversely away from said U-shaped channel for operative interaction with said latch bracket.

14. The assembly of claim 9 wherein said insert includes a pair of mounting flanges spaced apart from one another and straddling said latch bracket.

15. The assembly of claim 14 wherein said pair of mounting flanges and said latch bracket include at least two aligned holes, and a fastener extending through said aligned holes for securely retaining said insert in an operative position relative to said latch bracket.

16. A method for reducing vibration-induced noise in the connection between a movable seat back and a cabin wall, said method comprising the steps of:
providing a latch bracket on the seat back having a U-shaped slot;
lining the slot with a polymeric insert having a complimentary U-shaped channel;
providing a striker pin on the cabin wall;
tethering the seat back to the cabin wall by slidably engaging the striker pin inside the channel; and
creating a resiliently bendable section in the insert for dynamically deflecting in the region of abutting contact with the striker pin including interposing a stand-off between the insert and the slot of the latch bracket to establish an air space between at least a portion of the insert and the slot of the latch bracket.

17. A method for reducing vibration-induced noise in the connection between a movable seat back and a cabin wall, said method comprising the steps of:
providing a latch bracket on the seat back having a U-shaped slot;
lining the slot with a polymeric insert having a complimentary U-shaped channel;
creating a resiliently bendable section in the insert for dynamically deflecting in the region of abutting contact with the striker pin;
providing a striker pin on the cabin wall;
tethering the seat back to the cabin wall by slidably engaging the striker pin inside the channel; and
locating the bendable section relative to the latch bracket with a retaining strap.

* * * * *